(12) United States Patent
Huang et al.

(10) Patent No.: US 11,479,985 B2
(45) Date of Patent: Oct. 25, 2022

(54) COUPLING ASSEMBLY FOR A FRAME POOL AND A FRAME POOL

(71) Applicant: BESTWAY INFLATABLES & MATERIAL CORP., Shanghai (CN)

(72) Inventors: Shuiyong Huang, Shanghai (CN); Xiaobo Chen, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 0 days.

(21) Appl. No.: 17/218,981

(22) Filed: Mar. 31, 2021

(65) Prior Publication Data

US 2021/0324648 A1 Oct. 21, 2021

(30) Foreign Application Priority Data

Apr. 20, 2020 (CN) .......................... 202020587295.8

(51) Int. Cl.
*E04H 4/00* (2006.01)
(52) U.S. Cl.
CPC .................. *E04H 4/0056* (2013.01)
(58) Field of Classification Search
CPC ........................... E04H 4/0056; E04H 4/0018
USPC ............................................................. 4/506
See application file for complete search history.

(56) References Cited

U.S. PATENT DOCUMENTS

| | | | | |
|---|---|---|---|---|
| 5,083,327 A * | 1/1992 | Gillebaard | ............ | E04H 4/0056 220/4.16 |
| 10,246,891 B2 | 4/2019 | Huang | | |
| 2009/0205121 A1 * | 8/2009 | Cheng | ................... | E04H 4/0056 4/506 |
| 2016/0222686 A1 | 8/2016 | Liu | | |
| 2017/0089085 A1 | 3/2017 | Liu | | |
| 2019/0178275 A1 | 6/2019 | Lin et al. | | |
| 2020/0149570 A1 * | 5/2020 | Huang | ................. | F16B 7/0486 |
| 2020/0332544 A1 * | 10/2020 | Huang | ................. | E04H 4/0056 |

FOREIGN PATENT DOCUMENTS

EP 3255226 12/2017
WO 2020058854 3/2020

OTHER PUBLICATIONS

Extended European Search Report dated Aug. 5, 2021 (dated Aug. 5, 2021) issued on related European Patent Application EP 21167657.2 by the European Patent Office.

* cited by examiner

*Primary Examiner* — Huyen D Le
(74) *Attorney, Agent, or Firm* — Dickinson Wright PLLC

(57) ABSTRACT

A frame assembly for a frame pool and a frame pool including a frame assembly are provided. The frame assembly includes a horizontal support, a vertical support, a T-joint, and a coupling assembly releasably connecting a corresponding one of the horizontal support or the vertical support to the T-joint. The coupling assembly includes a collar having a tubular body. In some embodiments, a guide extends outwardly from the tubular body, and a limiting member moves through the guide between a locked position and an unlocked position to selectively retain the corresponding one of the horizontal support or the vertical support to the T-joint. In some embodiments, the limiting member is integrally formed with the tubular body and movable between the unlocked and locked positions to selectively retain the corresponding one of the horizontal support or the vertical support to the T-joint.

19 Claims, 10 Drawing Sheets

COUPLING ASSEMBLY FOR A FRAME POOL AND A FRAME POOL

CROSS-REFERENCE TO RELATED APPLICATIONS

This U.S. patent application claims priority to and the benefit of Chinese patent application number CN202020587295.8, filed Apr. 20, 2020, the entire disclosure of which is hereby incorporated by reference.

BACKGROUND OF THE INVENTION

1. Field of the Invention

The present invention generally relates to above-ground pools, and in particular to a coupling assembly for a frame pool, and a frame pool having the coupling assembly.

2. Related Art

This section provides background information related to the present disclosure which is not necessarily prior art.

An existing frame pool, as shown in FIG. 1, typically includes a frame assembly and a pool liner 14. The frame assembly may include a plurality of horizontal supports 11, a plurality of vertical supports 12, and a plurality of T-joints 13, with each of the T-joints 13 connecting a vertical support 12 to two of the horizontal supports 11. The pool liner 14 may include a pool wall 141 and a pool bottom 142, with the pool wall 141 hung on the frame assembly and arranged inside of the frame assembly. Ends of each of the horizontal supports 11 and the upper end of each vertical support 12 may be inserted into a corresponding one of the T-joints 13. Outer surfaces of the horizontal supports 11 and the vertical supports 12 may be provided with an anti-rust coating, such as epoxy resin, paint, etc. During installation and use, the anti-rust coating can be damaged due to friction between one of the supports 11, 12 and the T-joint 13. Such damage can result in corrosion. Furthermore, rainwater and water that is splashed from the pool during use can flow through gaps between the supports 11, 12 and the T-joints 13 and into the inside of the supports 11, 12, which may also cause or contribute to corrosion.

In some existing frame pools, the T-joints 13 are connected to the horizontal supports 11 and/or the vertical supports 12 with an insertion pin that passes through a through hole at corresponding positions in the T-joint 13 and the supports 11, 12. However, such insertion pins can still allow water to enter through the through hole, causing corrosion and rusting of the supports 11, 12. In addition, the connection of the supports 11, 12 and the T-joints 13 using insertion pins makes the assembly and disassembly of the frame pool unnecessarily complicated.

SUMMARY OF THE INVENTION

This section provides a general summary of the disclosure and should not be interpreted as a complete and comprehensive listing of all of the objects, aspects, features and advantages associated with the present disclosure.

According to an embodiment of the present invention, a frame assembly for a frame pool is provided. The frame assembly comprises a horizontal support having a first end and a second end opposite the first end, a vertical support having an upper end and a lower end opposite the upper end, and a T-joint connecting one of the ends of the horizontal support to the upper end of the vertical support. The frame assembly also comprises a coupling assembly releasably connecting a corresponding one of the horizontal support or the vertical support to the T-joint. The coupling assembly includes a collar having a tubular body configured to be disposed around the T-joint and one of the ends of the corresponding one of the horizontal support or the vertical support, with a guide extending outwardly from the tubular body. The coupling assembly also includes a limiting member that is movable through the guide between an unlocked position and a locked position to selectively retain the corresponding one of the horizontal support or the vertical support to the T-joint.

According to another embodiment of the present invention, a frame assembly for a frame pool is provided. The frame assembly comprises a horizontal support having a first end and a second end opposite the first end, a vertical support having an upper end and a lower end opposite the upper end, and a T-joint connecting one of the ends of the horizontal support to the upper end of the vertical support. The frame assembly also comprises a coupling assembly releasably connecting a corresponding one of the horizontal support or the vertical support to the T-joint. The coupling assembly includes a collar having a tubular body configured to be disposed around or within one of the ends of the corresponding one of the horizontal support or the vertical support. The coupling assembly also includes a limiting member integrally formed with the tubular body and movable between an unlocked position and a locked position to selectively retain the corresponding one of the horizontal support or the vertical support to the T-joint.

Further areas of applicability will become apparent from the description provided herein. The description and specific examples set forth in this summary are intended for purposes of illustration only and are not intended to limit the scope of the present disclosure.

BRIEF DESCRIPTION OF THE DRAWINGS

The drawings, as shown and described herein, are for illustrative purposes only of selected embodiments and are not intended to limit the scope of the present disclosure. The inventive concepts associated with the present disclosure will be more readily understood by reference to the following description, in combination with the accompanying drawings wherein.

DETAILED DESCRIPTION OF THE INVENTION

The implementation and application of the various embodiments will be discussed in detail below. However, it should be understood that the specific embodiments discussed only exemplarily describe the implementations and uses of the present invention, and are not intended to limit the scope of the present invention. Throughout the description, the structural positions of various components, e.g., upper, lower, top, bottom, etc., are not absolute but relative descriptions. The orientation expressions are appropriate when the various components are arranged, as shown in the FIGS., but should change accordingly when the positions of the various components in the FIGS. change.

It should be understood that the embodiments shown in the FIGS. only show exemplary shapes, dimensions, and arrangements of the products, according to the present disclosure, which are merely illustrative, but not restrictive. It should be appreciated that other shapes, dimensions, and arrangements may be employed without departing from the spirit and scope of the present invention. It should be noted that the accompanying drawings are not only intended to explain and illustrate the embodiments of the present invention, but also contribute to the definition of the present invention, if necessary. Furthermore, in the description, technical terms with directional expressions, such as "top," "bottom," "top sheet," and "bottom sheet," etc. are defined according to the directions shown in the accompanying drawings, and these technical terms are merely descriptive and not limiting.

Exemplary embodiments will now be described more fully with reference to the accompanying drawings. In general, the subject embodiments are directed to a frame assembly for a frame pool and a frame pool that includes a frame assembly.

Figure 1:
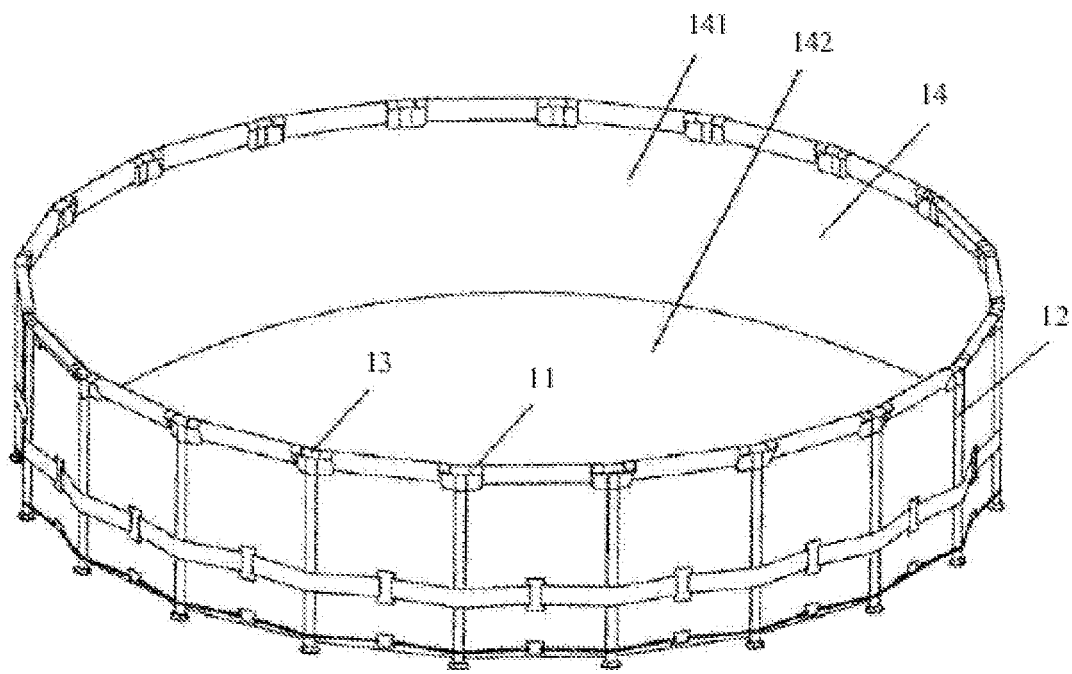
FIG. 1 is a perspective view of an existing frame pool.
Figure 2:
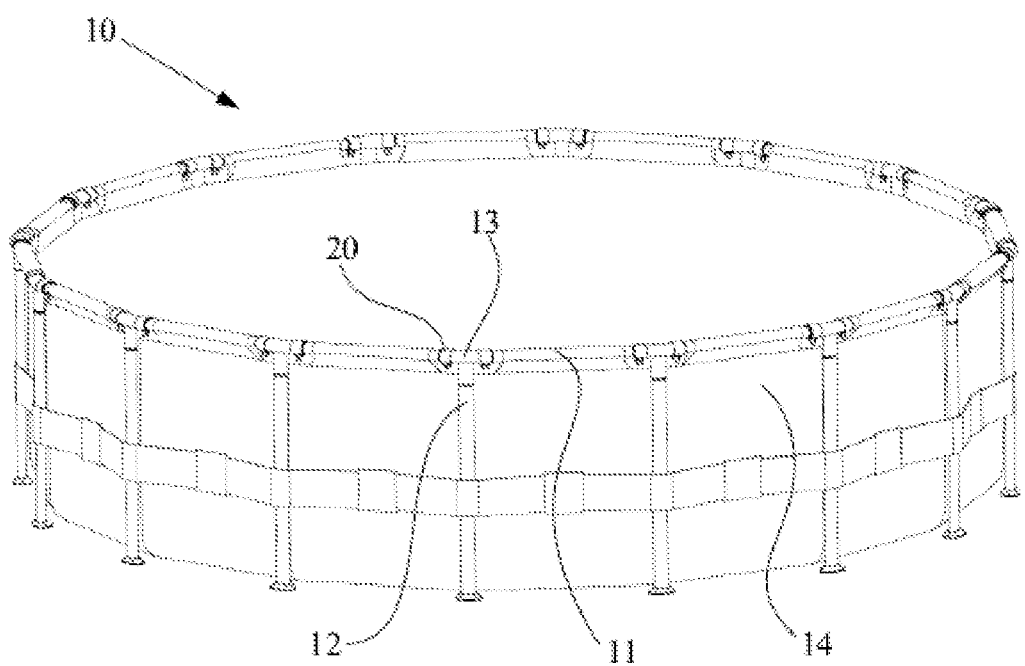
FIG. 2 is a perspective view of a frame pool, according to embodiments of the present disclosure.
Figure 3:
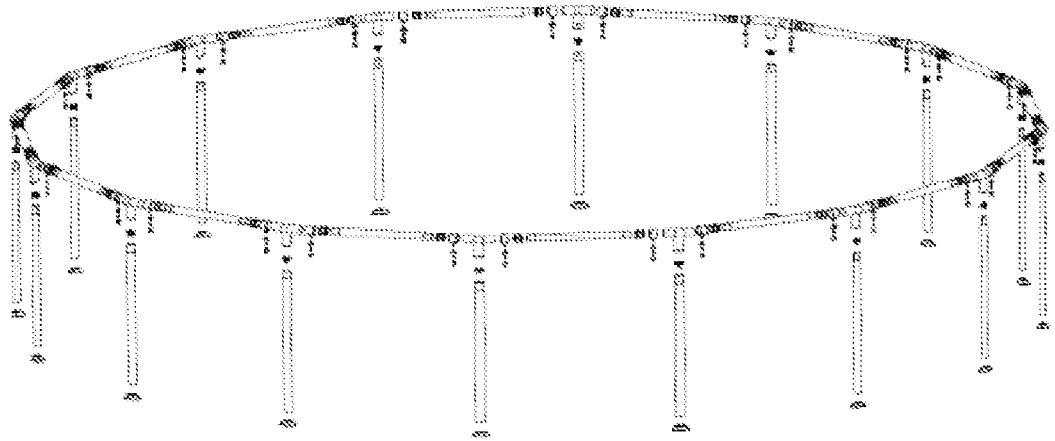
FIG. 3 is an exploded diagram of a frame assembly, according to a first embodiment of the present disclosure.
Figure 4:
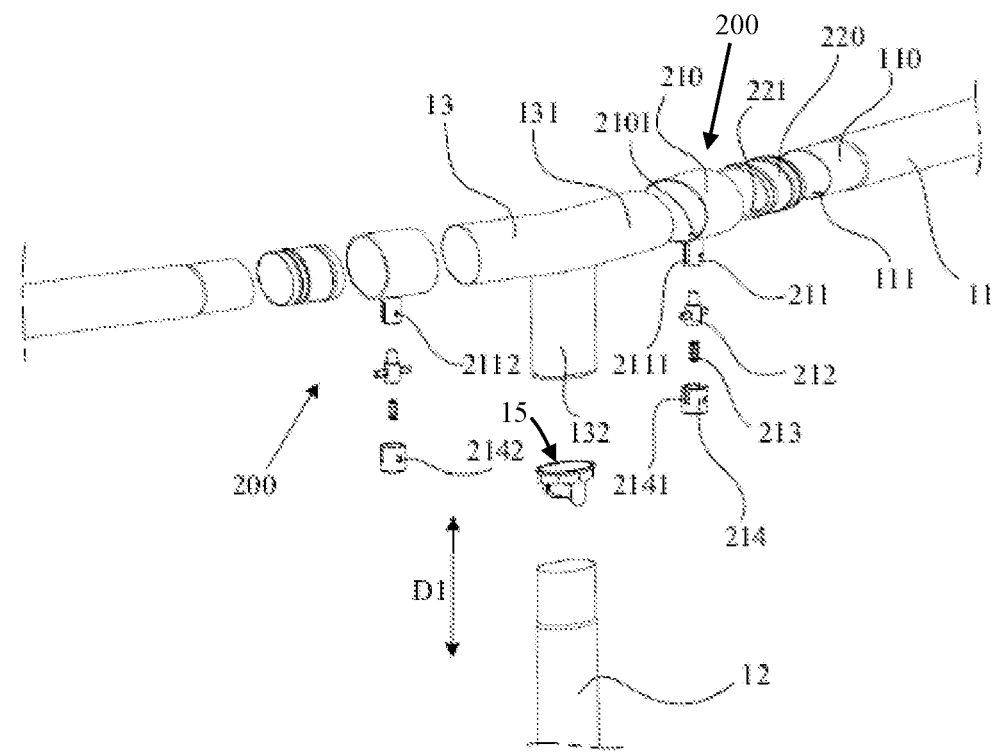
FIG. 4 shows an enlarged portion of the exploded diagram of FIG. 3, including a pair of coupling assemblies.

Referring to FIGS. 2 to 4, the present disclosure provides a frame pool including a frame assembly 10 and a pool liner 14. The frame assembly 10 comprises a plurality of horizontal supports 11, a plurality of vertical supports 12, and a plurality of T-joints 13 connecting one of the vertical supports 12 to two of the horizontal supports 11. Each horizontal support 11 has a first end and a second end opposite from the second end and may be similar or identical to each of the other horizontal supports 11 in the frame assembly 10. However, the frame assembly 10 may include horizontal supports 11 with different sizes and/or shapes. Each vertical support 12 has an upper end and a lower end opposite from the upper end and may be similar or identical to each of the other vertical supports 12 in the frame assembly 10. However, the frame assembly 10 may include vertical supports 12 with different sizes and/or shapes. Likewise, each T-joint 13 may be similar or identical to each of the other T-joints 13 in the frame assembly 10. However, the frame assembly 10 may include T-joints 13 with different sizes and/or shapes. One of the T-joints 13 is shown in FIG. 4 and includes two horizontal receiving parts 131 and a vertical receiving part 132. Each of the horizontal receiving parts 131 connects to a corresponding one of the horizontal supports 11, and the vertical receiving part 132 connects to a corresponding one of the vertical supports 12.

The frame assembly 10 further comprises a plurality of coupling assemblies 20, each releasably connecting a corresponding one of the horizontal supports 11 or the vertical supports 12 to one of the T-joints 13. The coupling assemblies 20 may each have a similar or identical configuration. However, the coupling assemblies 20 may have two or more different configurations. In some embodiments, the coupling assemblies 20 coupling each of the T-joints 13 to one or more horizontal supports 11 may have a first similar construction, and the coupling assemblies 20 coupling each of the T-joints 13 to a corresponding one of the vertical supports 12 may have a second similar construction that is different from the first similar construction. Such an arrangement is shown in FIG. 4, including a pair of coupling assemblies 200 having a first similar construction coupled to horizontal supports 11 and a coupling assembly 15 having a second similar construction different from the first similar construction and being coupled to a vertical support 12.

A coupling assembly 20 may comprise a collar 210, 310, 410, 510, 610 and a limiting member 212, 312, 412, 512, 612. The collar 210, 310, 410, 510, 610 includes a tubular body which may be disposed around an outer wall and/or within an inner wall of the horizontal receiving part 131 and/or the vertical receiving part 132 of the T-joint 13. The limiting member 212, 312, 412, 512, 612 can move between a locked position and an unlocked position in a first direction perpendicular to an outer wall of the collar 210, 310, 410, 510, 610 to selectively retain a corresponding horizontal support 11 or a corresponding vertical support 12 to the T-joint 13. It should be understood that the first direction is not limited to a first direction D1, exemplarily shown in FIG. 4, substantially parallel to the vertical receiving part 132, but should cover any direction perpendicular to the outer wall of the collar 210, 310, 410, 510, 610.

In some embodiments, the limiting member 212, 312, 412, 512 includes a positioning pin 2121, 3121, 4121, 5121 shaped to fit through a first through hole 2101, 3101, 4101, 5104 in a tubular body of the collar 210, 310, 410, 510, and the limiting member 212, 312, 412, 512 can cooperate with the first through hole 2101, 3101, 4101, 5104 to selectively retain a corresponding horizontal support 11 or a corresponding vertical support 12 vertical support to the T-joint 13. Specifically, in an unlocked position, the positioning pin 2121, 3121, 4121, 5121 can move out of the first through hole 2101, 3101, 4101, 5104 and be spaced apart from a third through hole 111 in a corresponding one of the horizontal supports 11 or the vertical supports 12, such that the horizontal support 11 or the vertical support 12 may be detached from the horizontal receiving part 131 or the vertical receiving part 132 of the T-joint 13. In a locked position, the positioning pin 2121, 3121, 4121, 5121 can extend through the first through hole 2101, 3101, 4101, 5104 and into the third through hole 111 in the corresponding one of the horizontal supports 11 or the vertical supports 12 such that the horizontal receiving part 131 or the vertical receiving part 132 of the T-joint 13 is locked with the horizontal support 11 or the vertical support 12. In some embodiments, the limiting member 212, 312, 412, 512 can be moved between the locked position and the unlocked position by manual operation.

Figure 16:
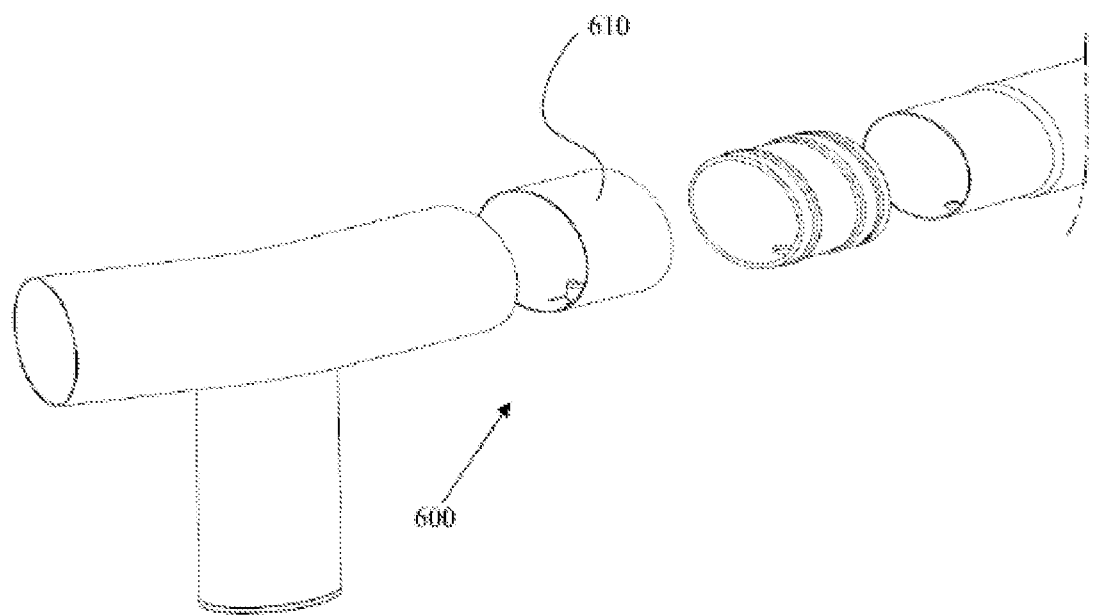
FIG. 16 is an exploded diagram of a frame assembly, according to a fifth embodiment of the present disclosure.
Figure 17:
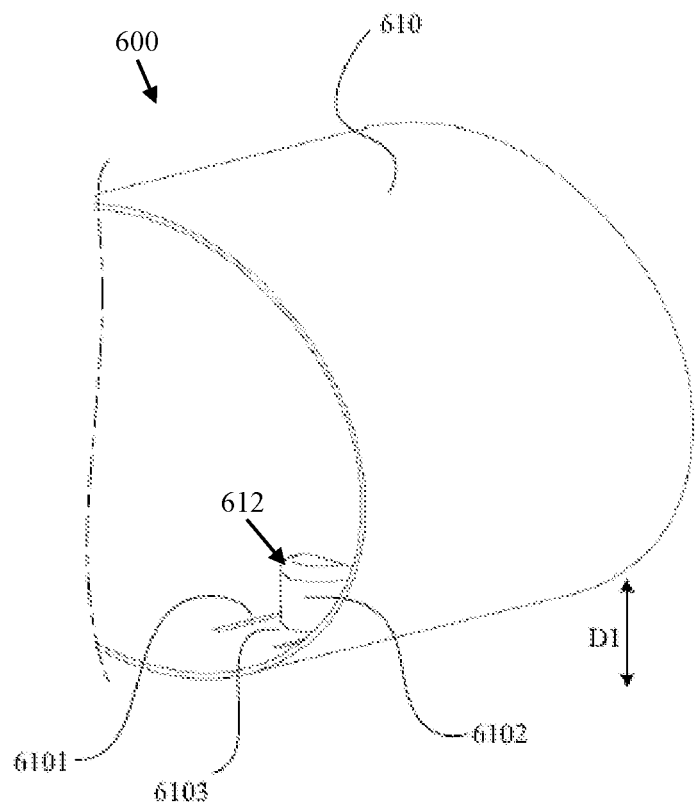
FIG. 17 shows a partial enlarged view of a collar from the coupling assembly of FIG. 16.
Figure 18:
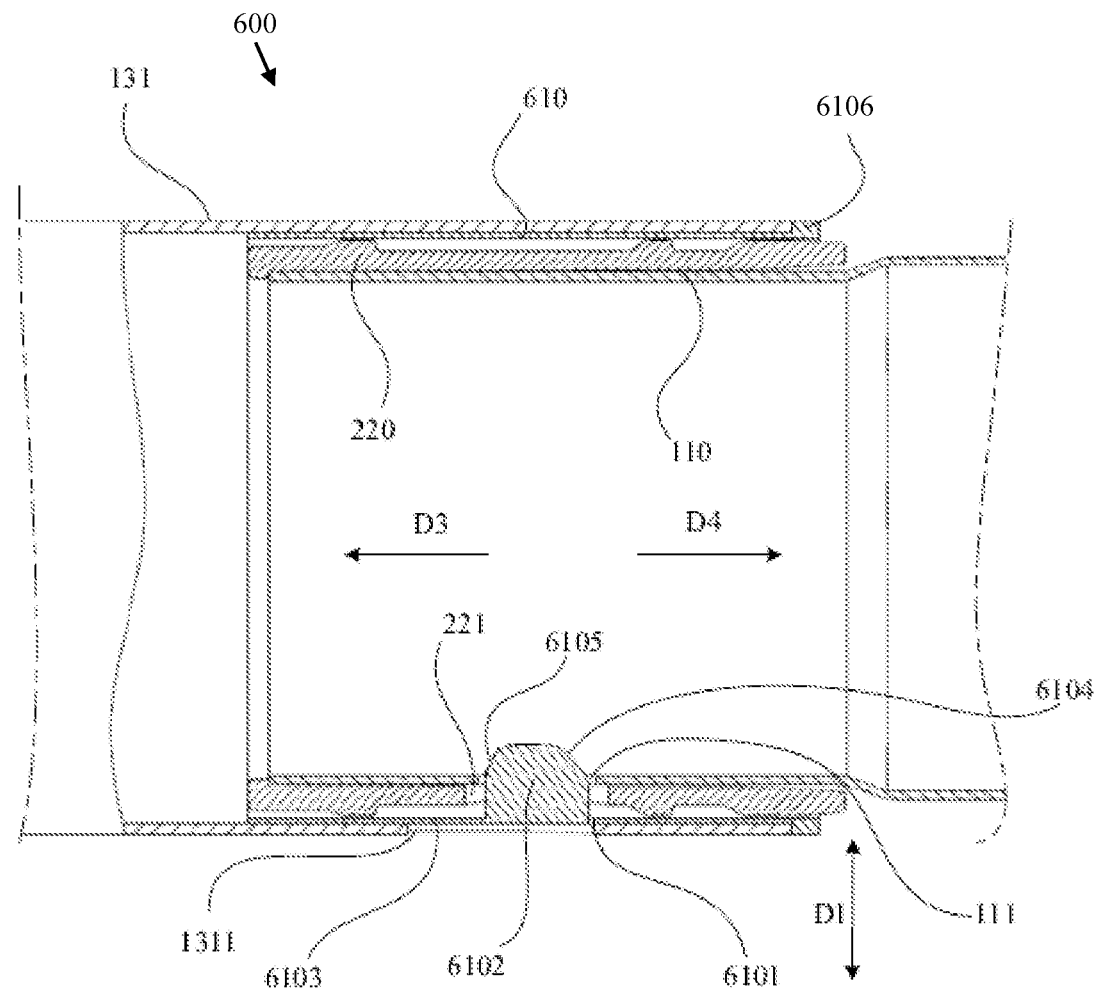
FIG. 18 shows a cross-sectional view of the coupling assembly of FIG. 16, in an assembled configuration.

In some embodiments, and as exemplarily shown in FIGS. 16-18, the limiting member 612 is integrally formed with the tubular body of the collar 610 and is movable between the unlocked position and the locked position to selectively retain the horizontal support 11 or the vertical support 12 to the T-joint 13.

In some embodiments, the limiting member 212, 312, 412, 512, 612 can be elastically biased between the locked position and the unlocked position. For example, in the embodiments shown in FIGS. 4-15, a spring 213, 313, 413, 513 can bias the limiting member 212, 312, 412, 512 from the unlocked position towards the locked position. In some other embodiments, and as shown by way of example in FIG. 17, the limiting member 612 is connected to the tubular body of the collar 610 by a base 6103 that elastically deforms to bias the limiting member 612 from the unlocked position towards the locked position.

In the following embodiments, the coupling assembly 200, 300, 400, 500, 600 is shown connecting the horizontal support 11 and the horizontal receiving part 131 of the T-joint 13. However, it should be understood that the coupling assembly 200, 300, 400, 500, 600 of the present disclosure can also be used for connecting the vertical support 12 and the vertical receiving part 132, or for connecting both of the horizontal support 11 and the vertical support 12 to the horizontal receiving part 131 and the vertical receiving part 132 of the T-joint 13, respectively.

Figure 5:
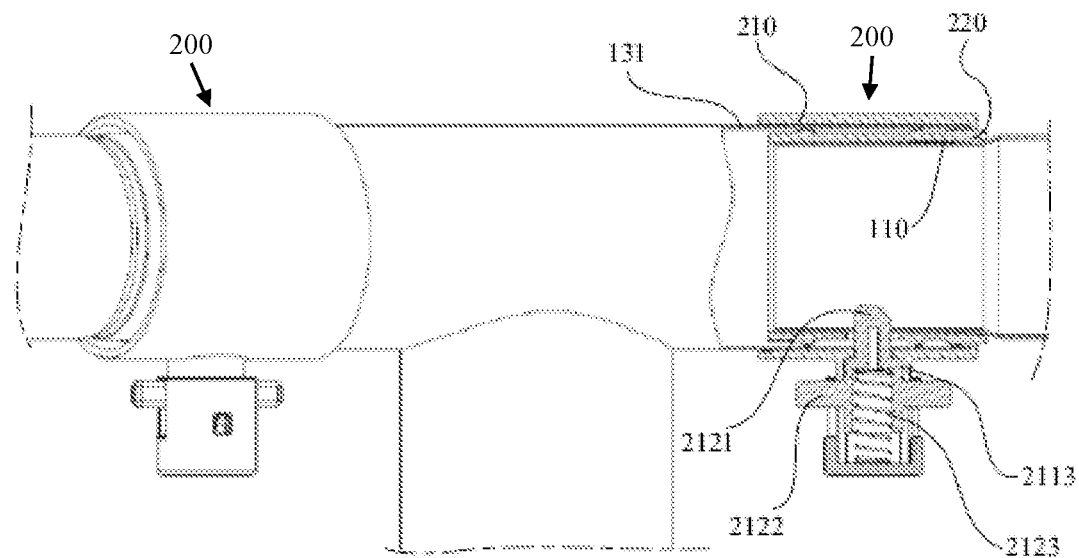
FIG. 5 is a partial cross-sectional diagram of one of the coupling assemblies of FIG. 4, in an assembled configuration.
Figure 6:
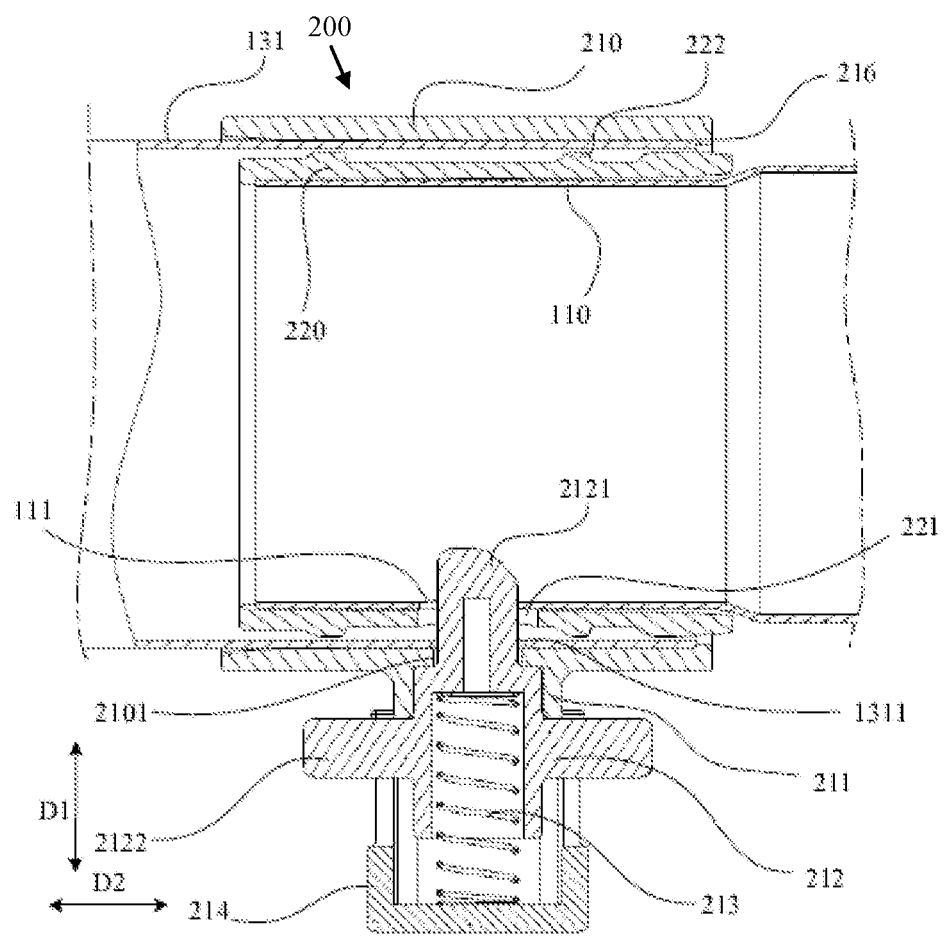
FIG. 6 shows an enlarged view of the cross-sectional diagram of FIG. 5.

In a first embodiment, shown in FIGS. 4 to 6, the coupling assembly 200 comprises a collar 210 having a tubular body disposed around an outer wall of the horizontal receiving part 131 of the T-joint 13. The tubular body of the collar 210 defines a first through hole 2101. In this embodiment, the coupling assembly 200 includes a guide 211 that comprises a tube extending outwardly from the tubular body of the collar 210, for example, in the first direction D1 perpendicular to a length of the tubular body of the collar 210. The guide 211 defines a first cavity 2113 that holds the limiting member 212. A cap 214 is connected to the guide 211, and a spring 213 arranged between the cap 214 and the limiting member 212 to bias the limiting member 212 towards the locked position. The spring 213 may be a coil spring, although other elastic materials may be used for the spring 213. The limiting member 212 includes a positioning pin 2121 that passes through the first through hole 2101 to selectively retain the horizontal support 11 to the horizontal receiving part 131 of the T-joint 13. As shown in FIGS. 5 and 6, the limiting member 212 defines a second cavity 2123 holding the spring 213.

The limiting member 212 further includes an unlocking component to urge the limiting member 212 to move in the first direction D1 for unlocking the collar 210. In this embodiment, the unlocking component includes one or more lugs 2122 that are integrally formed with the limiting member 212, for example, the two symmetrically-arranged lugs 2122, as shown in FIGS. 5 and 6. The lugs 2122 protrude out of the guide 211 in a second direction D2 perpendicular to the first direction D1. Specifically, the tube wall of the guide 211 defines one or more first slots 2111 extending in the first direction D1, for example, the two symmetrically-arranged first slots 2111 of FIG. 4 (one of the two first slots 2111 is shown). The cap 214 defines one or more second slots 2141 extending in the first direction D1, for example, the two symmetrically-arranged second slots 2141 of FIG. 4 (one of the two second slots 2141 is shown), and which are aligned with the first slots 2111 when the cap 214 is connected to the guide 211. In this way, each of the lugs 2122 can move in the first direction D1 along a channel defined by a corresponding first slot 2111 and a corresponding second slot 2141.

The cap 214 may be detachably connected to the guide 211. In some embodiments, as shown in FIG. 4, the outer wall of the guide 211 defines a hook 2112 configured to cooperate with a catch 2142 provided on the cap 214 to achieve a snap-fit connection, such that the limiting member 212 and the spring 213 are held in the first cavity 2113 of the guide 211.

The horizontal receiving part 131 or the vertical receiving part 132 of the T-joint 13 includes a second through hole 1311, as shown in FIG. 6, and the horizontal support 11 or the vertical support 12 includes a third through hole 111, as shown in FIG. 4. As shown in FIG. 6, the second through hole 1311 is located in the horizontal receiving part 131, and the third through hole 111 is located in a connecting end 110 of the horizontal support 11, while the first through hole 2101 is aligned with each of the second through hole 1311 and the third through hole 111.

In some embodiments, a sheath 220 may be provided to fill a gap between the outer wall of the horizontal support 11 and/or the vertical support 12 and the inner wall of the horizontal receiving part 131 and/or the vertical receiving part 132 of the T-joint 13. For example, as shown in FIGS. 4-6, the sheath 220 extends between the T-joint 13 and the horizontal support 11 to seal the gap, thereby preventing water intrusion into the frame assembly and any associated rust formation. As shown in FIG. 6, the sheath 220 defines a fourth through hole 221. When in the locked position, the fourth through hole 221 is aligned with the first through hole 2101. In other words, when in the locked position, the positioning pin 2121 extends through each of the first through hole 2101, the second through hole 1311, the third through hole 111, and the fourth through hole 221, as shown in FIG. 6.

FIG. 6 also shows that the collar 210 includes a catch 216, protruding radially inwardly from an inner wall of the tubular body and located adjacent to an end thereof, to abut against an end of the horizontal receiving part 131 or the vertical receiving part 132 of the T-joint 13. For example, the catch 216 may abut against an end of the horizontal receiving part 131, as shown in FIG. 6, to restrict movement of the horizontal receiving part 131. The spring 213 biases the limiting member 212 towards the locked position, wherein the positioning pin 2121 of the limiting member 212 passes through the first through hole 2101, the second through hole 1311, the fourth through hole 221 and the third through hole 111, thereby retaining the connecting end 110 of the horizontal support 11 to the horizontal receiving part 131 of the T-joint 13. To detach the horizontal support 11 from the T-joint 13, the lug 2122 can be moved downward in the first direction D1, thereby moving the positioning pin 2121 of the limiting member 212 out of the third through hole 111, the fourth through hole 221, the second through hole 1311 and the first through hole 2101. Alternatively, the positioning pin 2121 may only need to move out of the third through hole 111 to permit removal of the horizontal support 11. Whether the positioning pin 2121 is fully removed from all four through holes (111, 221, 1311 and 2101) or only the third through hole 111, the horizontal support 11 can be separated from the horizontal receiving part 131 to detach the horizontal support 11 from the T-joint 13. By releasing the lug 2122, the limiting member 212 can elastically return to the locked position via the biasing force of the spring 213.

Due to the cooperation between the limiting member 212 and the tubular wall of the collar 210, the coupling assemblies of the present disclosure provide for convenient and quick connection and detachment of the T-joint 13 and the horizontal support 11. The limiting member 212 may function to seal the through holes 2101, 111, blocking water flow into the tube body of the horizontal support 11. In addition, in some embodiments, the sheath 220 may include one or more annular raised ribs 222 on an outer wall thereof, as shown in FIG. 6, to prevent water from entering the gap between the horizontal support 11 and the horizontal receiving part 131. The sheath 220 may therefore aid in preventing moisture and corrosion inside of the frame assembly.

Figure 7:
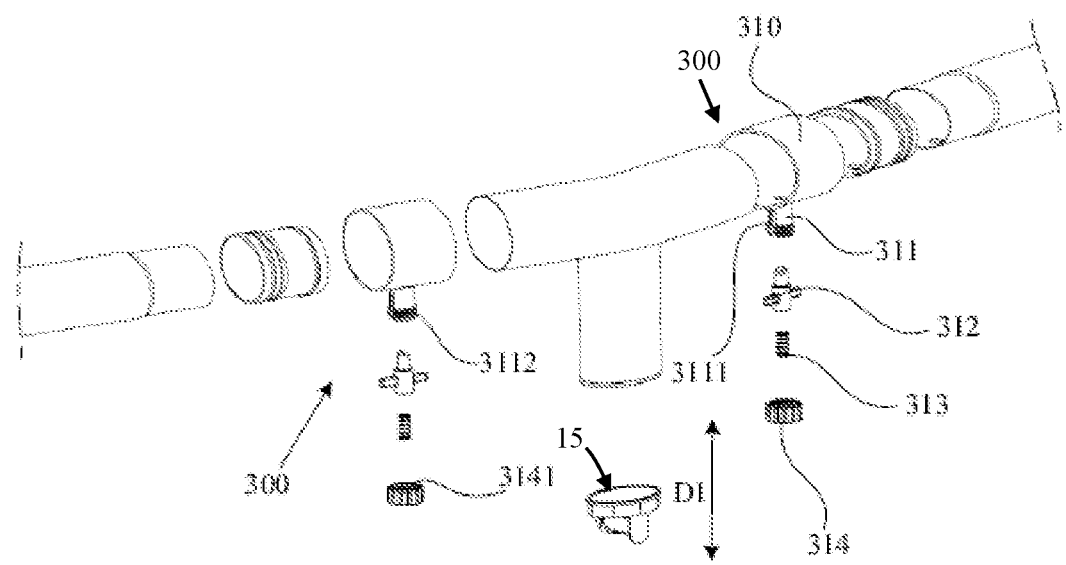
FIG. 7 shows an exploded diagram of a frame assembly, according to a second embodiment of the present disclosure.
Figure 8:
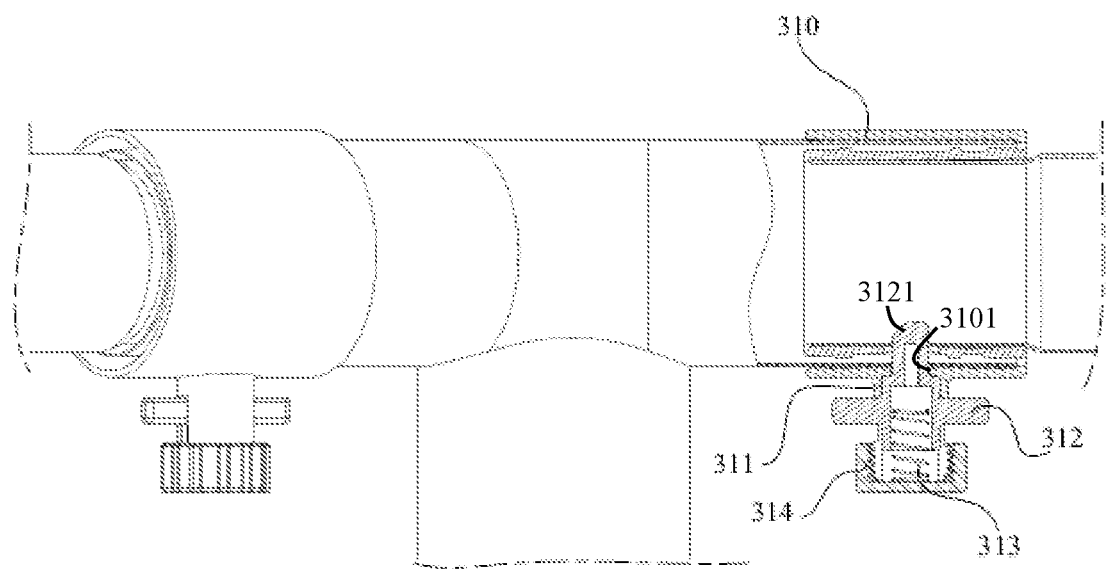
FIG. 8 is a partial cross-sectional diagram of one of the coupling assemblies of FIG. 7, in an assembled configuration.

FIGS. 7 and 8 show a coupling assembly 300, according to a second embodiment. The coupling assembly 300 is similar to the coupling assembly 200 of the first embodiment, as shown in FIGS. 4-6, and comprises a collar 310 and a guide 311 integrated therewith. The coupling assembly 300 of the second embodiment comprises a limiting member 312, a spring 313 and a cap 314. The guide 311 is provided with a first slot 3111. The coupling assembly 300 of the second embodiment may be similar to the coupling assembly 200 of the first embodiment, except that the guide 311 of the coupling assembly 300 is threadably connected to the cap 314. Specifically, the guide 311 is provided with external threads 3112, and the cap 314 is provided with corresponding internal threads 3141. In this embodiment, the cap 314 does not define a slot, and thus the lug of the limiting member 312 can only move in the first direction D1 along the first slot 3111 in the guide 311.

Figure 9:
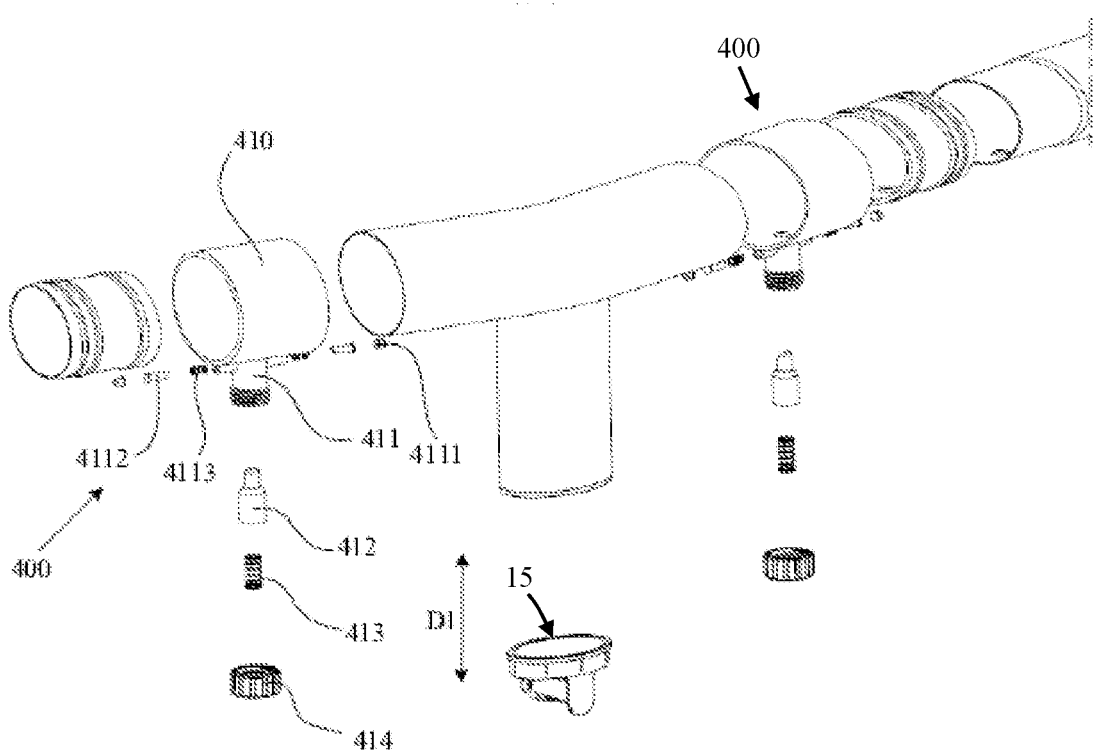
FIG. 9 shows an exploded diagram of a frame assembly, according to a third embodiment of the present disclosure.
Figure 10:
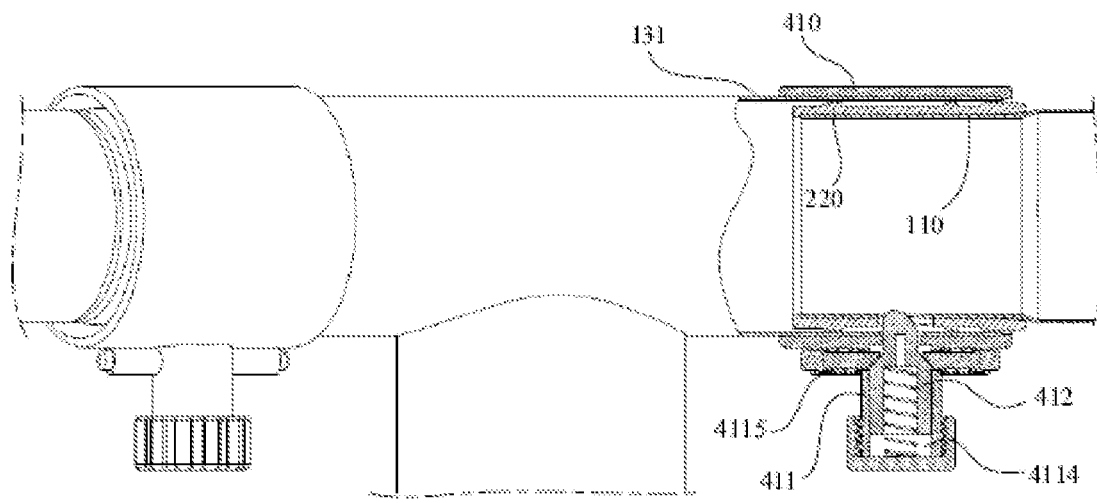
FIG. 10 is a partial cross-sectional diagram one of the coupling assemblies of FIG. 9, in an assembled configuration.
Figure 11:
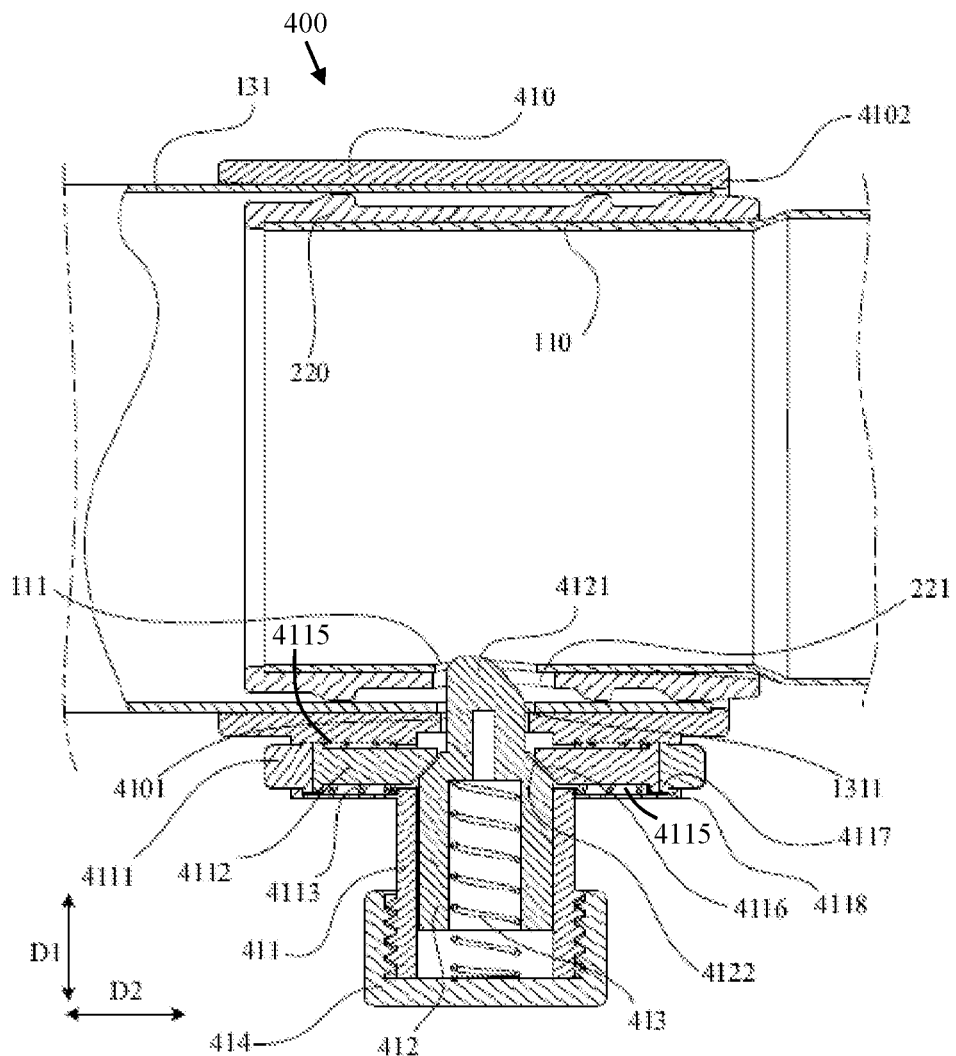
FIG. 11 shows an enlarged view of the cross-sectional diagram of FIG. 10.
Figure 12:
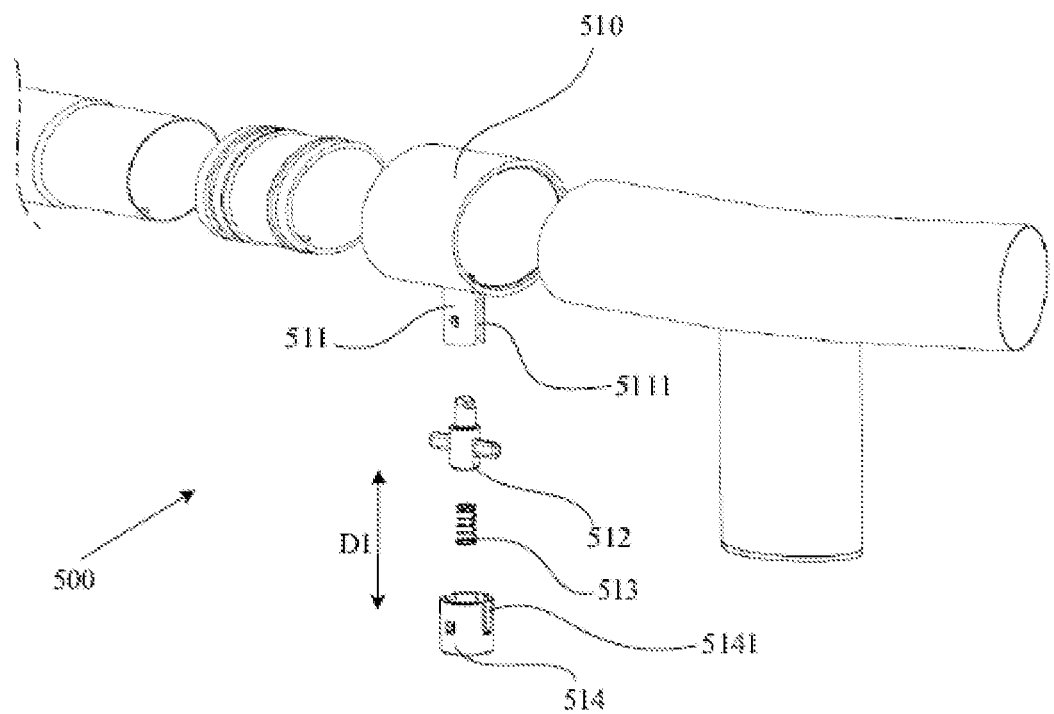
FIG. 12 shows an exploded diagram of a frame assembly, according to a fourth embodiment of the present disclosure.
Figure 13:
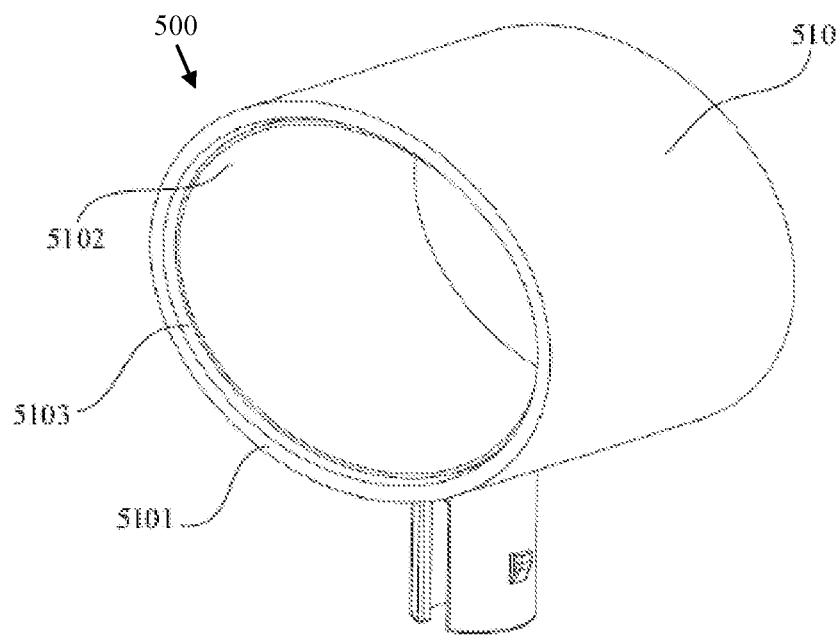
FIG. 13 shows an enlarged view of a collar from the coupling assembly of FIG. 12.
Figure 14:
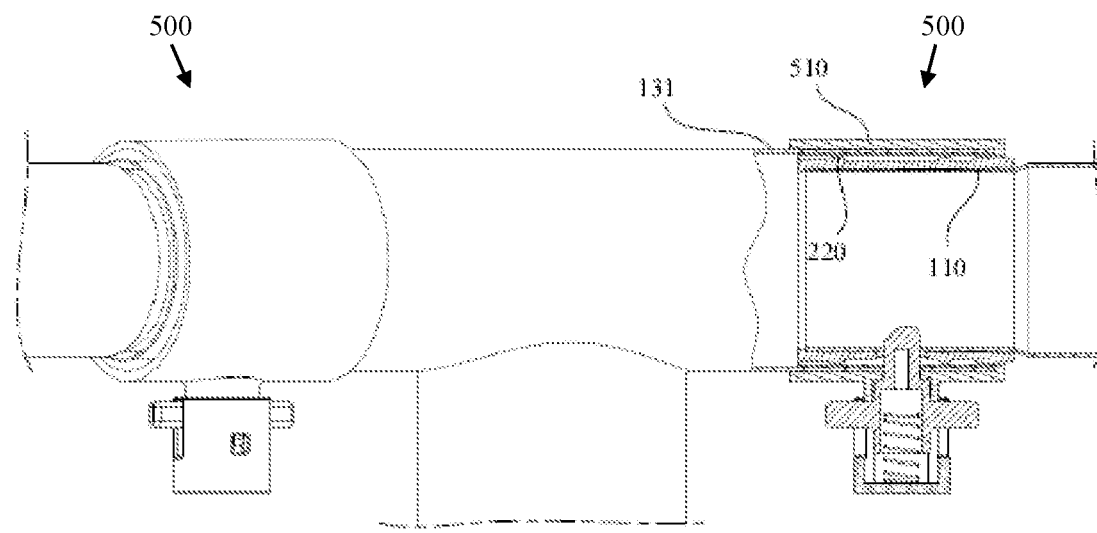
FIG. 14 is a partial cross-sectional diagram of one of the coupling assemblies of FIG. 12 (although only one coupling assembly is shown in FIG. 12), in an assembled configuration.

FIGS. 9 to 11 show a coupling assembly 400, according to a third embodiment. The coupling assembly 400 is similar to the coupling assembly 300 of the second embodiment, described above, and comprises a collar 410 having a tubular body and a guide 411 integrated therewith. As shown in FIG. 11, the collar 410 is provided with a first through hole 4101 and a catch 4102 located at an end of the tubular body. The coupling assembly 400 includes a limiting member 412, a spring 413 and a cap 414. The cap 414 is threadably connected with the guide 411. The coupling assembly 400 of the third embodiment is distinguished from other embodiments in that the guide 411 comprises a first tube extending along the first direction D1 perpendicular to the length of the tubular body of the collar 410, and one or more second tubes 4115 each extend in a second direction D2 perpendicular to the first direction D1. For example, the two symmetrically-arranged second tubes 4115, exemplarily shown in FIGS. 9-11, holding the unlocking components 4111, 4112, 4113 therein.

In this third embodiment, the unlocking components include a plunger 4111, 4112 disposed within each of the second tubes 4115 and moveable in the second direction D2. More specifically, the plunger 4111, 4112 elastically moves in the second direction D2 between an actuation position and a release position, wherein in the actuation position, the plunger 4111, 4112 can move against the limiting member 412 and urge the limiting member 412 to move to the unlocked position in the first direction D1, and in the release position, the plunger 4111, 4112 can elastically return and enable the limiting member 412 to elastically return to the locked position in the first direction D1.

In some embodiments, the plunger 4111, 4112 may comprise a single component with an actuating end facing the limiting member 412 and a pushing end located away from the limiting member 412. Alternatively, and as shown in FIG. 11, the plunger 4111, 4112 may comprise a first stop block 4111 spaced apart from the limiting member 412 to form a pushing end, and a second stop block 4112 located adjacent the limiting member 412 to form an actuating end. The outer wall of the limiting member 412 defines an inclined face 4122, and the second stop block 4112 has an inclined face 4116 corresponding to and abutting against the inclined face 4122 of the limiting member 412.

The plunger 4111, 4112 includes a peripheral flange 4117 spaced apart from the pushing end. More specifically, as shown in FIG. 11, the first stop block 4111 of the plunger 4111, 4112 may define the peripheral flange 4117 extending circumferentially thereabout. The second tube 4115 of the guide 411 includes an opening through which the first stop block 4111 protrudes out. The second tube 4115 includes an inner flange 4118 at the opening. For example, the inner flange 4118 may protrude radially inwardly perpendicular to the edge of the opening. When in the release position, the inner flange 4118 can abut against the peripheral flange 4117 of the first stop block 4111, thereby retaining the plunger 4111, 4112 within the second tube 4115. A spring 4113, such as a coil spring, is disposed around the outer wall of the second stop block 4112 to bias the plunger 4111, 4112 outwardly towards the release position. The spring 4113 can abut between the peripheral flange 4117 of the first stop block 4111 and the end wall of the second tube 4115 of the guide 411, assuming that the peripheral flange extending away from the second stop block 4112 in FIG. 11 is removed. Alternatively, and as shown in FIG. 11, a peripheral flange may be provided on the second stop block 4112 such that the spring 4113 can abut between the peripheral flange of the second stop block 4112 and the end wall of the second tube 4115 of the guide 411. In this way, when the first stop block 4111 is pressed, the peripheral flange of the first stop block 4111 or the second stop block 4112 compresses the spring 4113, such that the plunger 4111, 4112 can move inward in the second direction D2 to retract the positioning pin 4121 and permit detachment of the horizontal support 11. Similarly, when a user stops pressing the first stop block 4111, the spring 4113 rebounds to elastically returns the plunger 4111, 4112 to the released position in which the positioning pin 4121 returns to the locked position to hold the horizontal support 11.

In the locked position, as shown in FIG. 11, the positioning pin 4121 of the limiting member 412 passes through the first through hole 4101 of the collar 410, the second through hole 1311 of the horizontal receiving part 131, the fourth through hole 221 of the sheath 220, and the third through hole 111 of the connecting end 110 of the horizontal support 11, such that the connecting end 110 of the horizontal support 11 is fixedly connected to the horizontal receiving part 131. To detach the horizontal support 11 from the T-joint 13, the first stop block 4111 and the second stop block 4112 are pressed, and the interaction of the inclined part 4116 of the second stop block 4112 and the inclined face 4122 of the limiting member 412 urges the limiting member 412 to move downward in the first direction D1, such that the positioning pin 4121 of the limiting member 412 moves out of the third through hole 111 and the fourth through hole 221. Alternatively, the positioning pin 4121 may only need to move out of the third through hole 111 to permit removal of the horizontal support 11. Whether the positioning pin 4121 is fully removed from all four through holes (111, 221, 1311 and 4101) or only the third through hole 111, the horizontal support 11 can be separated from the horizontal receiving part 131 to detach the horizontal support 11 from the T-joint 13. Similarly, when the first stop block 4111 is released, the first stop block 4111 and the second stop block 4112 elastically return to the peripheral flange 4117 of the first stop block 4111, under the action of the spring 4113, to abut against the inner flange 4118 and allow the limiting member 412 to return to the locked position via the biasing force of the spring 413.

Figure 15:
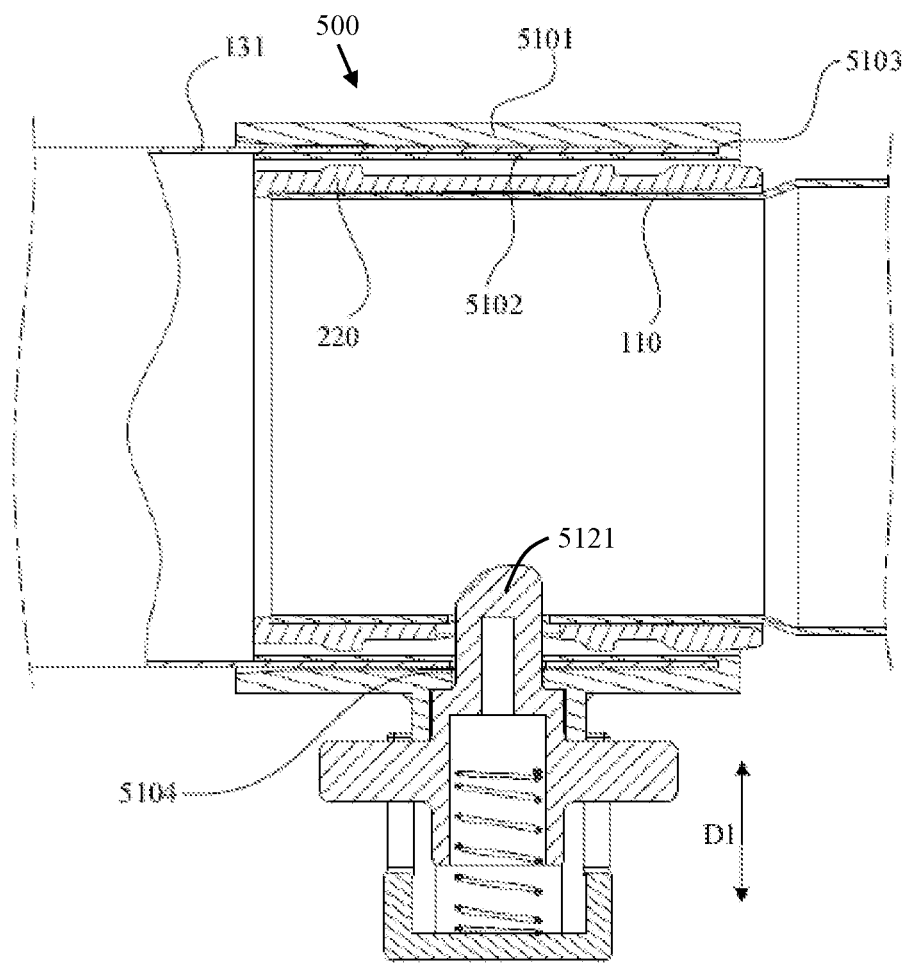
FIG. 15 shows an enlarged view of the cross-sectional diagram of FIG. 14.

FIGS. 12 to 15 show a coupling assembly 500, according to a fourth embodiment. The coupling assembly 500 is similar to the coupling assembly 200 of the first embodiment, described above, and comprises a collar 510 and a guide 511 integrated therewith. The coupling assembly 500 comprises a limiting member 512, a spring 513 and a cap 514. The guide 511 defines a first slot 5111. The cap 514 defines a second slot 5141, which is aligned with the first slot 5111, and the guide 511 has a snap-fit connection with the cap 514. As shown in FIG. 15, the collar 510 of the coupling assembly 500 of the fourth embodiment includes an inner tube wall 5102 and an outer tube wall 5101 extending coaxially around the inner tube wall 5102. The inner tube wall 5102 and the outer tube wall 5101 are connected to each other at one end to define an insertion slot 5103 therebetween. The insertion slot 5013 is configured to receive a tubular receiving part of the T-joint 13, such as the horizontal receiving part 131 or the vertical receiving part 132 of the T-joint 13. The first through hole 5104 may extend through both the inner tube wall 5102 and the outer tube wall 5101. It should be understood that, in this embodiment, the form of the limiting member 512 is merely exemplary, and the limiting member 512 may have other forms, such as the limiting member 312, 412 of the second or third embodiment.

FIGS. 16 to 18 show a coupling assembly 600, according to a fifth embodiment. The coupling assembly 600 of the fifth embodiment includes a collar 610 that is different from the collars 210, 310, 410, 510 of the other embodiments described above. The collar 610 of the coupling assembly 600 of the fifth embodiment has a tubular body that is sized to fit within the horizontal receiving part 131 and/or the vertical receiving part 132 of the T-joint 13. The tubular body of the collar 610 may be disposed around or within an end of the horizontal support 11 or the vertical support 12. For example, as shown in FIG. 18, the tubular body of the collar 610 may be disposed annularly around the connecting end 110 of the horizontal support 11, with the sheath 220 extending annularly between the tubular body of the collar 610 and the connecting end 110 of the horizontal support 11. The tubular body of the collar 610 may be disposed within and annularly surrounded by an inner wall of the horizontal receiving part 131 and/or the vertical receiving part 132. For example, as shown in FIG. 18, the tubular body of the collar 610 may be sheathed to the inner wall of the horizontal receiving part 131. The tubular body of the collar 610 includes a first through hole 6101; however, the collar 610 does not include a guide protruding radially outward from the tubular body. In this embodiment, the collar 610 includes a limiting member 612 integrally formed with the tubular body and movable between an unlocked position and a locked position to selectively retain a corresponding one of the horizontal support 11 or the vertical support 12 to the T-joint 13. As shown in FIG. 18, the limiting member 612 may comprise a base 6103 and a positioning pin 6102, wherein the base 6103 is integrally connected to the edge of the first through hole 6101 of the collar 610 to form an elastic member. As shown in FIG. 17, the width of the base 6103 is smaller than the width of the through hole 6101. The positioning pin 6102 protrudes from the base 6103 towards the inside of the collar 610 and can move in the first direction D1. More specifically, the positioning pin 6102 may move in an arcuate path as the base 6103 is bent, and the arcuate path may cause the positioning pin 6102 to move substantially in the first direction D1.

In some embodiments, the positioning pin 6102 may define an insertion inclined face 6104 arranged in an insertion direction D3 along the horizontal support 11 or the vertical support 12 and/or a moving-out inclined face 6105 arranged in a moving-out direction D4 along the horizontal support 11 or the vertical support 12. As shown in FIG. 18, when the connecting end 110 of the horizontal support 11 is inserted into the horizontal receiving part 131 of the T-joint 13 in the insertion direction D3, the horizontal support 11 presses the insertion inclined face 6104 of the positioning pin 6102 via the end of the connecting end 110 of the horizontal support 11 such that the base 6103 elastically deforms, and the positioning pin 6102 is biased downward from the first through hole 6101 and the second through hole 1311 of the horizontal receiving part 131 such that the horizontal support 11 can continue to be inserted into the horizontal receiving part 131. When the fourth through hole 221 of the sheath 220 and the third through hole 111 of the connecting end 110 of the horizontal support correspond to the positions of the first through hole 6101 and the second through hole 1311, the positioning pin 6102 can elastically return to pass through the third through hole 111 and the fourth through hole 221 such that the horizontal support 11 is connected to the horizontal receiving part 131 of the T-joint 13. When being unlocked, the horizontal support 11 is removed in the moving-out direction D4, such that the edges of the third through hole 111 and the fourth through hole 221 press the moving-out inclined face 6105 of the positioning pin 6102 to urge the base 6103 to elastically deform such that the positioning pin 6102 is biased downward from and moves out of the third through hole 111 and the fourth through hole 221, such that the horizontal support 11 can be detached from the horizontal receiving part 131. As also shown in FIG. 18, the collar 610 may include a catch 6106 extending outwardly from the tubular body and adjacent to an end of the tubular body for limiting the insertion depth of the collar 610 within the horizontal receiving part 131 of the of the T-joint 13.

In the above embodiments, the collar 210, 310, 410, 510, 610 and/or sheath 220 may be made of any suitable material, such as any suitable plastic material. Although the T-joint 13, the collar 210, 310, 410, 510, 610 and the sheath 220 are all shown as having a cylindrical cross-section, suitable alternative cross-sectional shapes, such as an oval shape, a D-shape or any other desired shape may also be used. In the embodiments described above, the frame pool may be an oval pool, a rectangular pool or any other polygonal pools, not limited to the shape of a circular pool, as shown in the figures. It should be understood here that the coupling assembly of the present disclosure can be applied to various different frame pools, and the embodiments shown in the figures only show the optional shapes, dimensions and arrangements of optional components of the coupling assembly, according to the present disclosure, which is merely illustrative but not restrictive, and other shapes, dimensions and arrangements may be employed without departing from the spirit and scope of the present disclosure.

The technical content and technical features of the present disclosure are disclosed above, but it could be understood that those skilled in the art may make variations and improvements to the concepts disclosed above under the inventive concepts of the present invention, and all such variations and improvements fall into the scope of the present invention. The scope of the present invention shall be defined by the claims.

Although multiple embodiments have been described herein, various modifications may be made to these embodiments without departing from the spirit of the invention, and all such modifications still belong within the concepts of the present invention and fall within the scope of the claims of the present invention. The scope of protection is only limited by the scope of the accompanying claims.

The disclosed systems and methods of operation are well adapted to attain the ends and advantages specifically disclosed, as well as those that are inherent therein. The particular implementations disclosed above are illustrative only, as the teachings of the present disclosure may be modified and practiced in different but equivalent manners apparent to those skilled in the art having the benefit of the teachings herein. Furthermore, no limitations are intended by the details of construction or design herein shown, other than as described in the claims below. It is therefore evident that the particular illustrative implementations disclosed above may be altered, combined, or modified and all such variations are considered within the scope of the present disclosure. The systems and methods of operation disclosed herein may suitably be practiced in the absence of any element that is not specifically disclosed herein and/or any optional element disclosed herein. The terms in the claims have their plain, ordinary meaning unless otherwise explicitly and clearly defined in the specification. Moreover, the indefinite articles "a" or "an," as used in the claims, are defined herein to mean one or more than one of the element that it introduces. If there is any conflict in the usages of a word or term in this specification and one or more patents or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each article of the list (i.e., each item). The phrase "at least one of" includes at least one of any one of the items, and/or at least one of any combination of the items, and/or at least one of each of the items. By way of example, the phrases "at least one of A, B, and C" or "at least one of A, B, or C" may each refer to only A, only B, or only C. Claim recitations of "first" or "second" are not necessarily limited to usage in the specification unless otherwise supported within the claim terminology. The various features described in reference to specific embodiments can be arranged with other embodiments without departing from the subject disclosure.

What is claimed is:

1. A frame assembly for a frame pool, comprising:
a horizontal support having a first end and a second end opposite the first end;
a vertical support having an upper end and a lower end opposite the upper end;
a T-joint connecting one of the ends of the horizontal support to the upper end of the vertical support; and
a coupling assembly releasably connecting a corresponding one of the horizontal support or the vertical support to the T-joint and including:
a collar having a tubular body configured to be disposed around the T-joint and one of the ends of the corresponding one of the horizontal support or the vertical support;
a guide extending outwardly from the tubular body; and
a limiting member movable through the guide between an unlocked position and a locked position to selectively retain the corresponding one of the horizontal support or the vertical support to the T-joint.

2. A frame pool, comprising:
a pool liner; and
the frame assembly of claim 1;
wherein the horizontal support is one of a plurality horizontal supports, the vertical support is one of a plurality of vertical supports, the T-joint is one of a plurality of T-joints, and the coupling assembly is one of a plurality of coupling assemblies.

3. The frame assembly of claim 1, wherein the limiting member comprises a positioning pin shaped to fit within a through hole in the corresponding one of the horizontal support or the vertical support; and
in the unlocked position, the positioning pin is spaced apart from the through hole, and in the locked position, the positioning pin is disposed within the through hole.

4. The frame assembly of claim 1, wherein the guide comprises a tube which is integrally formed with the tubular body of the collar.

5. The frame assembly of claim 1, wherein the coupling assembly further comprises a cap connected to the guide and a spring, disposed between the cap and the limiting member, which biases the limiting member toward the locked position.

6. The frame assembly of claim 5, wherein the limiting member comprises therein a cavity within which the spring is disposed.

7. The frame assembly of claim 5, wherein the cap is coupled to the guide by one of a snap-fit connection or a threaded connection.

8. The frame assembly of claim 1, wherein the guide comprises a tube extending in a first direction perpendicular to a length of the tubular body of the collar, and a slot in the tube extending in the first direction; and
the limiting member comprises a lug extending perpendicularly to the slot and moveable within the slot between the unlocked position and the locked position.

9. The frame assembly of claim 1, wherein the guide comprises:
a first tube extending along a first direction perpendicular to a length of the tubular body of the collar;
a second tube extending in a second direction perpendicular to the first direction; and
a plunger disposed within the second tube and moveable in the second direction.

10. The frame assembly of claim 9, further comprising a spring which biases the plunger away from the limiting member.

11. The frame assembly of claim 9, wherein the limiting member has an inclined face, and the plunger has an actuating end having an inclined face corresponding to and abutting the inclined face of the limiting member.

12. The frame assembly of claim 9, wherein the plunger has an actuating end abutting the limiting member and a pushing end which protrudes from the second tube of the guide.

13. The frame assembly of claim 12, wherein:
the plunger comprises a peripheral flange spaced apart from the pushing end; and the second tube comprises an inner flange at an opening thereof, disposed to engage the peripheral flange, thereby retaining the plunger within the second tube.

14. The frame assembly of claim 1, wherein the tubular body of the collar comprises an inner tube wall and an outer tube wall extending coaxially around the inner tube wall, the inner tube wall and the outer tube wall defining therebetween an insertion slot configured to receive a tubular receiving part of the T-joint.

15. The frame assembly of claim 1, wherein the collar further comprises a catch located at an end of the tubular body and extending radially inward.

16. A frame assembly for a frame pool, comprising:
a horizontal support having a first end and a second end opposite the first end;
a vertical support having an upper end and a lower end opposite the upper end;
a T-joint connecting one of the ends of the horizontal support to the upper end of the vertical support; and
a coupling assembly releasably connecting a corresponding one of the horizontal support or the vertical support to the T-joint and including:
a collar having a tubular body configured to be disposed around or within one of the ends of the corresponding one of the horizontal support or the vertical support; and
a limiting member integrally formed with the tubular body and movable between an unlocked position and a locked position to selectively retain the corresponding one of the horizontal support or the vertical support to the T-joint.

17. The frame assembly of claim 16, wherein the tubular body of the collar is sized to fit within the T-joint.

18. The frame assembly according to claim 16, wherein the collar further comprises a catch located at an end of the tubular body and extending radially outward or radially inward from the tubular body.

19. A frame pool, comprising:
a pool liner; and
the frame assembly of claim 16;
wherein the horizontal support is one of a plurality of horizontal supports, the vertical support is one of a plurality of vertical supports, the T-joint is one of a plurality of T-joints, and the coupling assembly is one of a plurality of coupling assemblies.

* * * * *